United States Patent [19]
Johns et al.

[11] Patent Number: 5,959,045
[45] Date of Patent: Sep. 28, 1999

[54] PROCESS FOR PREPARING POLYKETONES

[75] Inventors: David Michael Johns, St. Albans; Richard Tomanek, Carronshore, both of United Kingdom

[73] Assignee: BP Chemicals Limited, London, United Kingdom

[21] Appl. No.: 09/092,227

[22] Filed: Jun. 5, 1998

[30] Foreign Application Priority Data

Jun. 10, 1997 [GB] United Kingdom ............ 9712086

[51] Int. Cl.$^6$ .................................................. C08G 67/02
[52] U.S. Cl. ................................................ 526/64; 528/392
[58] Field of Search ................................ 526/64; 528/392

[56] References Cited

U.S. PATENT DOCUMENTS

| | | | |
|---|---|---|---|
| 4,473,482 | 9/1984 | Serres et al. .................... | 528/392 X |
| 4,831,113 | 5/1989 | Van Broekhoven et al. ....... | 528/392 |
| 4,914,183 | 4/1990 | Geuze et al. ...................... | 528/392 |

FOREIGN PATENT DOCUMENTS

| | | |
|---|---|---|
| 121965 | 10/1984 | European Pat. Off. . |
| 314309 | 5/1989 | European Pat. Off. . |
| 340844 | 11/1989 | European Pat. Off. . |
| 404228 | 12/1990 | European Pat. Off. . |
| 425009 | 5/1991 | European Pat. Off. . |
| 508502 | 10/1992 | European Pat. Off. . |
| 516239 | 12/1992 | European Pat. Off. . |
| 619335 | 10/1994 | European Pat. Off. . |

OTHER PUBLICATIONS

*Encyclopedia of Chemical Technology* (Kirk–Othmer; Third Edition, vol. 16; pp. 428–445; ©1981).

*Encyclopedia of Polymer Science and Engineering* (vol. 6; pp. 471–488; ©1986).

*Primary Examiner*—Fred Teskin
*Attorney, Agent, or Firm*—Fay, Sharpe, Beall, Fagan, Minnich & McKee

[57] ABSTRACT

A method of reducing reactor fouling in a polyketone polymerization process so as to allow continuous operation of the process. The method comprises contacting a mixture of carbon monoxide and one or more olefins in the presence of a suitable catalyst and a liquid diluent in a polymerization reactor characterized in that the gas head space in the reactor is no more than 5% of the total internal volume of the reactor or the polymerization reactor has substantially no head space. Where a loop reactor is employed, fouling of the loop conduit is reduced by maintaining the contents of the loop conduit in a turbulent state and above a minimum flow velocity.

26 Claims, 1 Drawing Sheet

PROCESS FOR PREPARING POLYKETONES

The present invention relates to a process for preparing polyketones by reacting one or more olefins with carbon monoxide in the presence of a suitable catalyst, for example, a palladium catalyst. In particular, the invention relates to carrying out the polymerisation process in a substantially liquid full reactor.

It is known to produce polyketones which are linear alternating polymers of (a) one or more olefins and (b) carbon monoxide, by a liquid phase (slurry) process in which the olefins and carbon monoxide are polymerised together in methanol, ethanol or propanol solvent in the presence of a palladium catalyst. Such a process, which is disclosed in more detail in, for example, EP 121965 and EP 314309, typically employs a catalyst derived from (a) a palladium compound (b) a source of an anion which is either non-coordinating or only weakly coordinating to palladium and (c) a bisphosphine of formula $R^1R^2P$—R—$PR^3R^4$ (I) where $R^1$ to $R^4$ are independently aryl groups which can optionally be polar substituted and R is a divalent organic bridging group such as —$(CH_2)_n$—(n=2–6). A source of the anion is typically its conjugate acid.

However, a problem with carrying out the process of the prior art, particularly in alcohol based slurry phase, is that fouling of the reactor occurs. Without wishing to be bound by any theory, it is believed that fouling takes the form of a thin layer of paper-like material upon which particulate product is subsequently deposited. This fouling would severely restrict the operation of the process particularly in the preferred continuous mode.

A number of approaches to overcoming the fouling problem have been tried. Soluble additives can be used. However, these are not very successful at reducing the fouling and in addition increase the complexity of the catalyst system or even deactivate it. Seeding the reactor at the start of the process has the effect of decreasing the level of fouling. In particular, the seed material can itself be a polyketone. However, the fouling is decreased, but not eliminated by such an approach. Further approaches have included polishing the reactor surfaces or applying Nylon or Teflon coatings to them, in order to reduce or prevent adhesion of the fouling layer. However, these also have not proved totally effective, and add to the cost of the procedure.

We have now found an alternative method of considerably reducing reactor fouling sufficiently to allow continuous operation of the polymerisation process.

Thus, according to the present invention, there is provided a liquid phase method of preparing polyketones comprising contacting a mixture of carbon monoxide and one or more olefins in the presence of a suitable catalyst and a liquid diluent in a polymerisation reactor characterised in that the gas head space in the reactor is no more than 5% of the total internal volume of the reactor or the polymerisation reactor has substantially no head space.

Figure 1:
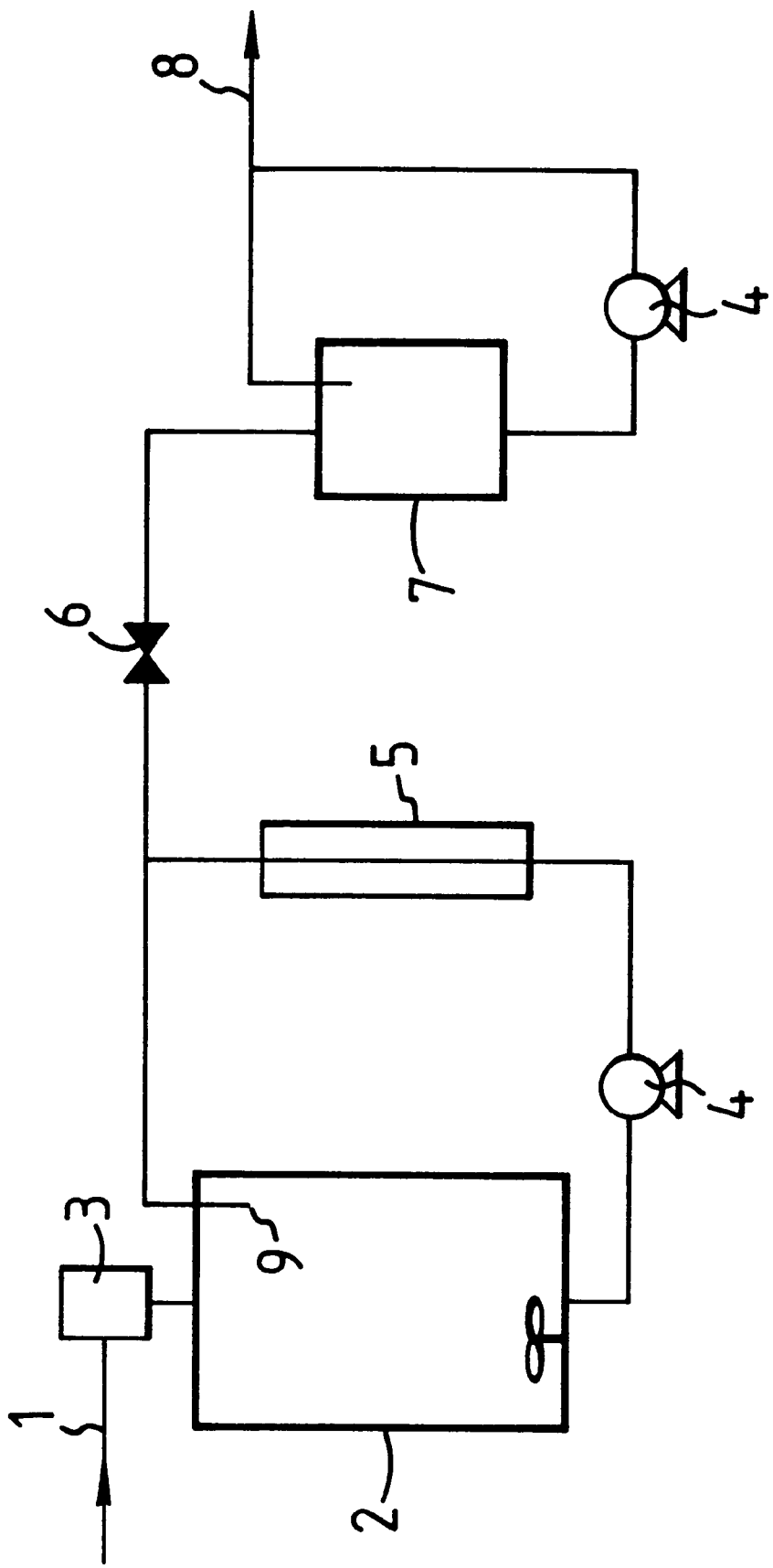
FIG. 1 depicts a preferred embodiment of the reactor system for operating the process of the invention.

The reactor can be any reactor that is suitable for preparing polyketones. Typically such a reactor can be a "stirred tank" reactor (generally of circular cross section) or a "loop" reactor. The reactor is provided with a facility for introducing gaseous reagents (e.g. carbon monoxide and gaseous olefins), and/or liquid reagents (e.g. liquid olefins, catalyst/co-catalyst solution, and solvents). Such a facility may be multi-functional, for example, for the introduction of liquid and gas or may be dedicated to the introduction of a single reagent. A suitable facility for introduction of gas/liquid is an injector-mixing nozzle (as described in EP 0516239). The injector mixing nozzle may optionally be provided with an eductor.

Suitable means for agitating the contents of a "stirred tank" reactor vessel include an injector mixing nozzle and/or a helical, anchor, curved blade, turbine or rushton impeller.

The loop reactor may comprise a reactor vessel and a circulation loop conduit or alternatively, a "Phillips" type loop reactor may be used (see, for example, "Encylopedia of Chemical Technology", Kirk-Othmer, Third Edition, Volume 16, pages 428–445 and "Encyclopedia of Polymer Science and Engineering", Volume 6, John Wiley & Sons, 1986). A "Phillips" type loop reactor comprises a loop conduit i.e. there is no separate reactor vessel. Where the loop reactor comprises a reactor vessel and a circulation loop conduit, the contents of the reactor vessel may be agitated by means of an injector-mixing nozzle and/or an impeller. Suitable impellers include those listed above. The contents of the loop reactor may be circulated through the loop conduit using a propelling means (circulation device) positioned in the loop conduit. Suitable propelling means include a propeller, impeller, an open vane centrifugal, screw centrifugal or gear pump. Such propelling means have "open" configurations which reduces "fouling" or "choking" of the propelling means. By "loop conduit" is meant either the conduit of a circulation loop or the conduit of a "Phillips" type loop reactor. Gaseous reagents may be introduced, using either a multi-functional or a dedicated facility, into the "pump" suction of the propelling means. Where the loop reactor comprises a reactor vessel and a circulation loop the gaseous reagents may be introduced into the lower part of the reactor vessel, preferably below the agitating means, or may be introduced at the position where the circulating polymer slurry is returned to the reactor vessel. Preferably, the circulating polymer slurry is returned to the upper part of the reactor vessel, typically by means of an injector-mixing nozzle. It is envisaged that the gaseous reagents can be introduced at one or more positions into the reactor. Preferably, the gaseous reagents are introduced at one or more positions where there is intensive mixing of the gaseous reagents and the liquid phase, for example, into the pump suction or into an injector-mixing nozzle. Advantages of intensive mixing of the gaseous reagents and the liquid phase include improved gas uptake and the polymer product having a higher molecular weight.

Preferably, the contents of the circulation loop or the "Phillips" type loop reactor are maintained in a turbulent state and above a minimum flow velocity. The term "turbulent" is used in the conventional hydraulic sense, namely, as defining flow which is non-laminar. Fluid flow in terms of the conventional Reynolds number $$\frac{\text{Diameter} \times \text{velocity} \times \text{density}}{\text{viscosity}}$$

is generally considered to be "laminar" at values up to about 1200 and "turbulent" at values above about 2,000. Thus, where a loop reactor is used in the method of the present invention it is preferred that the loop conduit has a Reynolds number in the range 2,000 to 500,000, more preferably 10,000 to 300,000. This has an advantage that fouling is further minimised owing to "scouring" of the walls of the loop conduit. Typically, the flow velocity within the loop conduit is in the range 5 to 15 m/s, preferably 6 to 12 m/s Typically, the diameter of the loop conduit is at least 1 inch preferably at least 5 inches, more preferably at least 10 inches. Where the loop reactor comprises a reactor vessel and a circulation loop, the diameter of the loop conduit is typically in the range 1 to 24 inches, preferably 10 to 18 inches. Where a "Phillips" type loop in employed, the loop conduit preferably has a diameter of at least 25 inches, for example, at least 40 inches.

Preferably, the length of the loop conduit is minimised and the diameter of the loop conduit is maximised in order to minimise fouling of the loop conduit and to reduce frictional energy losses.

Also, the loop conduit should be designed so as to avoid any settling of the polymer particles and/or deposition of polymer particles on the walls of the loop conduit. This may be accomplished by adopting one or more of the following measures: operating under turbulent flow conditions, minimising the number of bends in the loop, avoiding any sharp bends, ensuring the loop conduit has smooth surfaces, positioning the loop vertically and designing the loop so as to provide maximum flow in the vertical direction and a minimum flow in the horizontal direction, for example, by providing a loop having a short horizontal length and a long vertical length. Usually, the loop conduit is sized to provide a vertical length which is between about 3 and about 20 times the horizontal length.

There will usually be associated with the reactor other ancillary equipment; for example, where the process is operated in the continuous mode, a means for discharging polymer continuously from the reactor will typically be fitted, together with a heat exchanger and optionally a condenser. Preferably, the heat exchanger is operated in counter-current mode. In the absence of a condenser the loop conduit should be of sufficient length to provide a sufficient heat transfer area. Typically, the heat exchanger is operated using a temperate coolant. An advantage of operating the heat exchanger in counter-current mode and of using a temperate coolant is that this reduces fouling in the loop conduit in the region of the heat exchanger. Without wishing to be bound by any theory, it is believed that fouling is increased in regions where the circulating slurry comes into contact with cold surfaces.

It is a feature of the present invention that the reactor is to be operated so that any gas head space in the reactor is no more than 5% of the total internal volume of the reactor or the reactor has substantially no gas head space. It is to be understood that the gas head space is the volume occupied by gas in a reactor which is partially filled with liquid at operating conditions and does not include gas dissolved in the liquid phase. Reactor is a term of art and the skilled man will know what is meant by "reactor" and will be able to calculate its total internal volume. The internal volume of the reactor will encompass the entire space where the polymerisation reaction substantially takes place. "Dead" spaces, where there is substantially no liquid but which are in communication with the body of the reactor, would not be regarded as contributing to the total internal volume of the reactor. Additional vessels, where there may be substantially no liquid and in which no polymerisation reaction occurs, may be in communication with the body of the reactor. These additional vessels are not regarded as contributing to the total internal volume of the reactor.

Preferably, the reactor is fitted with a level pot which is in communication with the reactor. The provision of a level pot allows accurate control of the amount of liquid phase in the reactor. Typically, the level pot is partially filled with liquid diluent, preferably the level pot is 10–80% full, for example, 50% full. Preferably, liquid diluent is fed to the level pot while catalyst is fed to the reactor. Thus, the liquid diluent in the level pot is substantially free of catalyst thereby ensuring that substantially no fouling occurs at the gas-liquid interface in the level pot. Since substantially no polymerisation reaction occurs in the level pot, this "additional vessel" is not regarded as contributing to the total internal volume of the reactor.

Where a loop reactor is employed comprising a reactor vessel and a loop conduit, the level pot is preferably in communication with the reactor vessel. Preferably, the level pot is situated above the reactor vessel. Where the reactor vessel is operated with a head space the level pot is isolatable from the reactor vessel.

Preferably, the level pot is fitted with a gas vent. An advantage of a gas vent is that this provides flexibility with respect to the rate of addition of gaseous reagents to the reactor. Thus, at high addition rates any excess gaseous reagents can be vented from the reactor. The provision of a vent also allows excess gaseous reagents to be present in the reactor.

The reactor may also be fitted with a condenser for removal of heat from the reactor. Preferably, the condenser is fitted to the level pot so as to avoid fouling of the inlet to the condenser.

It is preferred that the gas head space in the reactor is no more than 2%, more preferably no more than 1% of the total internal volume of the reactor. Ideally, the reactor is operated "liquid full", that is to say with substantially no head space.

By the term polyketone is meant a linear polymer comprised of alternating —CO— and —X— units derived from one or more olefins. Typically X is either —$CH_2CH_2$—, in the case where carbon monoxide and ethylene are copolymerised, or a statistical mixture of —$CH_2CH_2$— and —$CH_2CH(R)$—(R=$C_1$–$C_8$ alkyl, phenyl or methyl or ethyl substituted phenyl), in the case where carbon monoxide, ethylene and at least one $C_3$–$C_{10}$ alpha olefin are polymerised. It is preferred that the process of the present invention is used to prepare polyketones of the latter composition and in particular that the polyketones are those prepared from carbon monoxide and mixtures of ethylene and $C_3$–$C_6$ alpha olefins. Most preferred of all are those materials prepared from carbon monoxide and mixtures of ethylene and propylene. For the preferred polyketones, it is preferred that at least 70 mol % of the —X— units are —$CH_2CH_2$—, most preferably at least 80 mol %. The exact composition of the polyketone can be adjusted by making appropriate changes to the relative proportions of the reactants employed.

The polyketone prepared using the method of the present invention may have a number average molecular weight of between 20,000 and 1,000,000 preferably between 40,000 and 500,000, more preferably between 50,000 and 250,000, for example 60,000 to 150,000.

The polyketone prepared using the method of the present invention will suitably have a particle size in the range 1 $\mu$m to 2000 $\mu$m, preferably 10 $\mu$m to 1000 $\mu$m and most preferably 50 $\mu$m to 750 $\mu$m.

As regards the catalyst, any catalyst which is suitable for the polymerisation of carbon monoxide and one or more olefins to give polyketones can be used. In particular, group VIII metal catalysts are preferred and in particular those based on palladium. A typical catalyst composition would be that described in EP 121965 and EP 314309, as set out herein above.

Alternatively, a catalyst composition which is based on:
(a) a group VIII metal compound,
(b) a Lewis acid of the general formula $MF_n$, in which M represents an element that can form a Lewis acid with fluorine, F represents fluorine and n has the value 3 or 5 and (c) a dentate ligand containing at least two phosphorus-, nitrogen- or sulphur-containing dentate groups through which the dentate ligand can complex with the group VIII metal.

These catalyst compositions are set out in EP 508502.

Also suitable are catalyst compositions as detailed in EP 619335 which comprise (a) a Group VIII metal compound, containing at least one ligand capable of coordinating to the Group VIII metal and (b) a boron hydrocarbyl compound preferably a Lewis acid of the formula BXYZ where at least one of X Y and Z is a monovalent hydrocarbyl group.

Typically the boron hydrocarbyl compound is a compound of the formula $BR_3$ where R is a $C_1$–$C_6$ alkyl, or an aryl group for example, a substituted or unsubstituted phenyl group, for example $C_6H_5$, $ClC_6H_4$, or $C_6F_5$.

Typically the ligand capable of coordinating to the Group VIII metal is a bidentate phosphine ligand, for example, a ligand of the formula (I) herein above. Alternatively, the ligand may be a bidentate phosphine ligand having at least two phosphorus atoms joined by a bridging group of the formula —$(N)_x$—$(P)_y$—N— where x is 0 or 1 and y is 0 or 1, in particular, a bridging group of the formula —$(NR^2)_x$—$(PR^3)_y$—$NR^2$— where each $R^2$ is the same or different and $R^2$ and $R^3$ represent a monovalent organic group. A preferred ligand has the formula (II) $R^1{}_2P$—$(NR^2)_x$—$(PR^3)_y$—$NR^2$—$PR^1{}_2$ where each $R^1$ is independently an aryl, alkyl, alkoxy, amido or substituted derivative thereof, $R^2$ is a hydrogen, a hydrocarbyl or hetero group, $R^3$ is a hydrocarbyl or hetero group. For any of the catalyst systems described herein above preferred bidentate ligands are (o-anisyl)$_2$—X—P(o-anisyl)$_2$ where X=—$(CH_2)_n$—n=2–4, or X=N(R) R=$C_1$–$C_6$ alkyl or aryl.

Suitable solvents for the process include alcohols, (e.g. methanol or ethanol), ketones (e.g. acetone), ethers, halogenated solvents (e.g. chloroform or dichloromethane), saturated or unsaturated hydrocarbons (e.g. toluene, pentane, hexane, heptane, or cyclohexane) and mixtures thereof. Alternatively, the process can be solvent-free if one of the reactant olefins is a liquid under reaction conditions.

The process is suitably carried out under superatmospheric pressure e.g. 1–150 barg, preferably 10–100 barg, more preferably 20–70 most preferably 40–70 barg, and at a temperature in the range 25–130° C. for example 50–95° C. The molar ratio of olefinic compounds to carbon monoxide is preferably 10:1–1:10 in particular 5:1–1:5.

The process of the invention may of course be carried out in conjunction with other known methods for reducing fouling, such as the use of polished or coated reactor/pump surfaces, additives and seeding as previously mentioned.

A preferred embodiment of the reactor system for operating the process of the invention is shown in the accompanying drawing (FIG. 1). The system comprises a solvent feed 1 into a reactor vessel 2 via a level pot 3, a circulation loop and circulation device i.e. a propelling means (a pump, for example, an axial flow impeller, screw centrifugal or gear pump 4), a heat exchanger 5 and a set of actuated dump valves 6. A portion of the reactor slurry is transferred to a flash vessel 7 through the dump valves, and then transferred via line 8 to a storage vessel prior to polymer isolation. The remainder of the reactor slurry is returned to the reactor via a nozzle 9 which may optionally be fitted with an eductor. For the purposes of the invention, the level pot 3 may be considered as an "additional vessel" as described above; it is not considered part of the reactor, as substantially no polymerisation takes place there. When the process of the invention is carried out, the reactor vessel 2 is preferably completely full (i.e. there is substantially no head space), with the top of the liquid being in the level pot. The liquid level in the pot is measured continuously. The system may be fitted with a second circulation loop which is isolatable from the reactor vessel 2. This second circulation loop is used if it becomes necessary to remove any polymer deposited on the walls of the first circulation loop thereby avoiding shut-down of the process of the invention.

EXAMPLE 1

A polyketone having a melting point of 230–240° C. and a molecular weight of 40–100,000 was produced continuously for 72 hours in the reactor system of FIG. 1, with "liquid full" operation (i.e. no head space) at 45 barg, 68° C. The residence time was 4 hours and the catalyst concentration 0.02 g/l. Catalyst—Pd(OAc)$_2$dppp [palladium diacetate 1,3 bis(diphenylphosphino)propane] Co-catalyst—tris pentafluorophenyl borane Ratio of cocatalyst: catalyst =20–30:1 by weight. Solvent—dichloromethane The reactor was then operated for a further 24 hours with a head space of 20% of the total internal volume of the reactor. When the reactor was opened, substantial fouling was observed in the reactor head space area and in the level pot. This fouling consisted of thick polymer deposits in the region of the gas/liquid interface and on the internal surface of the reactor lid. Total running time in this example was 100 hours, of which the last 24 hours were with the reactor operated with a head space of 20% of the total internal volume of the reactor.

EXAMPLE 2

Polyketone having a melting point of 213–224° C. and with a molecular weight of 70,000 was produced continuously for 190 hours in liquid full operation at 50 barg, 66–68° C., with a residence time of 4 hours and a catalyst concentration of 0.02 g/l. The catalyst and solvent systems were the same as in Example 1. The loop circulation velocity was 2 m/s. When the reactor was opened, it was observed that in contrast to Example 1, the reactor walls had no thick polymer deposit in the region of the gas/liquid interface, and the internal surface of the reactor lid was essentially free of polymer. In this example, the skin growth in the loop was 5–6 mm thick, and the vanes of the centrifugal pump were partially blocked.

EXAMPLE 3

Polyketone having a melting point of 220° C. and with a molecular weight of 60,000 was produced continuously for 450 hours in liquid full operation at 50 barg, 68° C., with a residence time of 4 hours and a catalyst concentration of 0.02 g/l. The catalyst and solvent systems were the same as in Example 1. In this example the loop circulation velocity was 5 m/s.

At the end of this run, as in example 2, the reactor walls and lid were essentially clean, while in contrast to example 2, the skin growth in the loop was only 1 mm thick. The vanes of the open vane centrifugal pump were clear.

The above Examples show clearly that operating with minimal gas head space reduces reactor fouling, while higher loop conduit circulation velocities reduce fouling of the loop conduit and propelling means. Also, operating with minimal gas head space and using higher loop conduit circulation velocities enables much longer running times to be achieved.

We claim:

1. A liquid phase method of preparing polyketones comprising contacting a mixture of carbon monoxide and one or more olefins in the presence of a suitable catalyst and a liquid diluent in a polymerisation reactor characterised in that the gas head space in the reactor is no more than 5% of the total internal volume of the reactor or the polymerisation reactor has substantially no head space.

2. A method as claimed in claim 1 wherein the gas head space in the reactor is no more than 2% of the total internal volume of the reactor.

3. A method as claimed in claim 1 wherein the reactor comprises a loop conduit and a propelling means positioned in the loop conduit.

4. A method as claimed in claim 3 wherein the loop conduit has a diameter of at least 25 inches.

5. A method as claimed in claim 1 wherein the reactor comprises a reactor vessel, a circulation loop conduit and a propelling means positioned in the loop conduit.

6. A method as claimed in claim 5 wherein the loop conduit has a diameter in the range 10 to 18 inches.

7. A method as claimed in claim 3 wherein the contents of the loop reactor are circulated through the loop conduit by a propelling means selected from the group consisting of a propeller, an impeller, an open vane centrifugal pump, and screw centrifugal pump and a gear pump.

8. A method as claimed in claim 3 wherein gaseous reagents are introduced into the pump suction of the propelling means.

9. A method as claimed in claim 3 wherein the loop conduit has a Reynolds number in the range 2,000 to 500,000.

10. A method as claimed in claim 3 wherein the flow velocity within the loop conduit is in the range 5 to 15 m/s.

11. A method as claimed in claim 3 wherein the loop conduit is provided with a heat exchanger which is operated in counter-current mode using a temperate coolant.

12. A method as claimed in claim 1 wherein the reactor comprises a stirred tank reactor vessel.

13. A method as claimed in claim 5 wherein the reactor vessel is provided with an agitating means selected from the group consisting of an injector mixing nozzle, a helical, anchor, curved blade, turbine and rushton impeller.

14. A method as claimed in claim 13 wherein gaseous reagents are introduced into an injector mixing nozzle.

15. A method as claimed in claim 1 wherein the reactor is fitted with a level pot which is in communication with the reactor.

16. A method as claimed in claim 15 wherein the level pot is 10–80% filled with liquid diluent.

17. A method as claimed in claim 15 wherein the level pot is fitted with a gas vent.

18. A method as claimed in claim 15 wherein liquid diluent is fed to the level pot and catalyst is fed to the reactor.

19. A method as claimed in claim 1 wherein the surfaces of the reactor and/or the propelling means are polished or have coatings applied to them.

20. A method as claimed in claim 1 wherein the reactor is seeded with a solid particulate material at the start of the polymerisation.

21. A method as claimed in claim 5 wherein the contents of the loop reactor are circulated through the loop conduit by a propelling means selected from the group consisting of a propeller, an impeller, an open vane centrifugal pump, and screw centrifugal pump and a gear pump.

22. A method as claimed in claim 5 wherein gaseous reagents are introduced into the pump suction of the propelling means.

23. A method as claimed in claim 5 wherein the loop conduit has a Reynolds number in the range 2,000 to 500,000.

24. A method as claimed in claim 5 wherein the flow velocity within the loop conduit is in the range 5 to 15 m/s.

25. A method as claimed in claim 5 wherein the loop conduit is provided with a heat exchanger which is operated in counter-current mode using a temperate coolant.

26. A method as claimed in claim 12 wherein the reactor vessel is provided with an agitating means selected from the group consisting of an injector mixing nozzle, a helical, anchor, curved blade, turbine and rushton impeller.

* * * * *